(12) United States Patent
Sato

(10) Patent No.: US 10,643,114 B2
(45) Date of Patent: May 5, 2020

(54) IMAGE FORMING APPARATUS AND RECORDING MEDIUM SUITABLE FOR IMAGE FORMING PROCESSING BASED ON PDL (PAGE DESCRIPTION LANGUAGE) WHICH GENERATES A DISPLAY LIST USING A SPECULATIVE PROCESS BEFORE DATA ANALYSIS OF AN OBJECT OF PDL IS COMPLETED

(71) Applicant: KYOCERA Document Solutions Inc., Osaka (JP)

(72) Inventor: Yasuhide Sato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/182,613

(22) Filed: Nov. 7, 2018

(65) Prior Publication Data
US 2019/0138863 A1 May 9, 2019

(30) Foreign Application Priority Data
Nov. 7, 2017 (JP) .................................. 2017-214575

(51) Int. Cl.
*G06K 15/02* (2006.01)
*G06K 15/00* (2006.01)
*G06F 3/12* (2006.01)

(52) U.S. Cl.
CPC ....... *G06K 15/1822* (2013.01); *G06F 3/1213* (2013.01); *G06F 3/1247* (2013.01);
(Continued)

(58) Field of Classification Search
CPC ........... G06K 15/1822; G06K 15/1811; G06K 15/1813; G06K 15/1849; G06K 15/1857; G06K 15/408; G06F 3/1213; G06F 3/1247
See application file for complete search history.

(56) References Cited

U.S. PATENT DOCUMENTS

2011/0043855 A1   2/2011 Ono
2015/0009540 A1*  1/2015 Ono ................... G06K 15/1822
                                                         358/3.24
(Continued)

FOREIGN PATENT DOCUMENTS

EP         1435591 A1     7/2004

OTHER PUBLICATIONS

Extended European Search Report, dated Feb. 12, 2019.

*Primary Examiner* — Quang N Vo
(74) *Attorney, Agent, or Firm* — Hawaii Patent Services; Nathaniel K. Fedde; Kenton N. Fedde

(57) ABSTRACT

Provided is an image forming apparatus for further speeding up an image forming process. A first rendering core of a rendering core module executes data analysis of an object of PDL format printing information. A second rendering core executes a speculative process for generating a Display List for an object. A third rendering core executes a rendering process for a printout or display output based on the Display List generated by the second rendering core. In addition, data analysis by the first rendering core and the speculative process by the second rendering core are executed in parallel processing. As a result, the second rendering core can execute the generation of a Display List by a speculative process even without receiving a rendering command from the first rendering core.

3 Claims, 5 Drawing Sheets

(52) U.S. Cl.
CPC ...... *G06K 15/1811* (2013.01); *G06K 15/1813* (2013.01); *G06K 15/1849* (2013.01); *G06K 15/1857* (2013.01); *G06K 15/408* (2013.01)

(56) References Cited

U.S. PATENT DOCUMENTS

| | | |
|---|---|---|
| 2015/0278654 A1 | 10/2015 | Minakata |
| 2016/0350631 A1 | 12/2016 | Minakata |
| 2018/0181846 A1* | 6/2018 | Koziarz ............. G06K 15/1817 |

\* cited by examiner

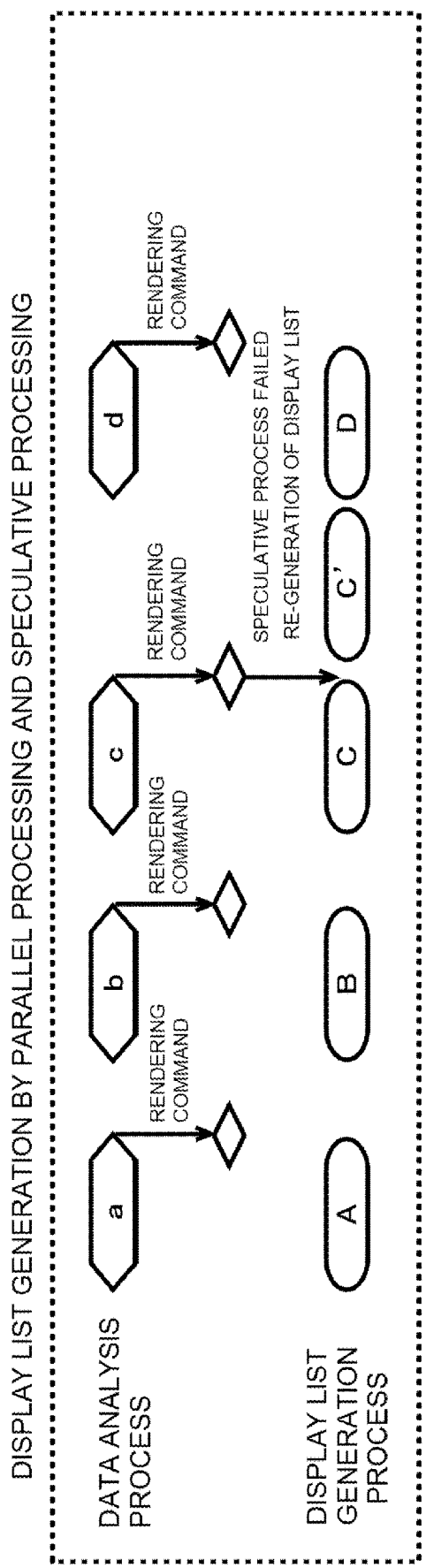

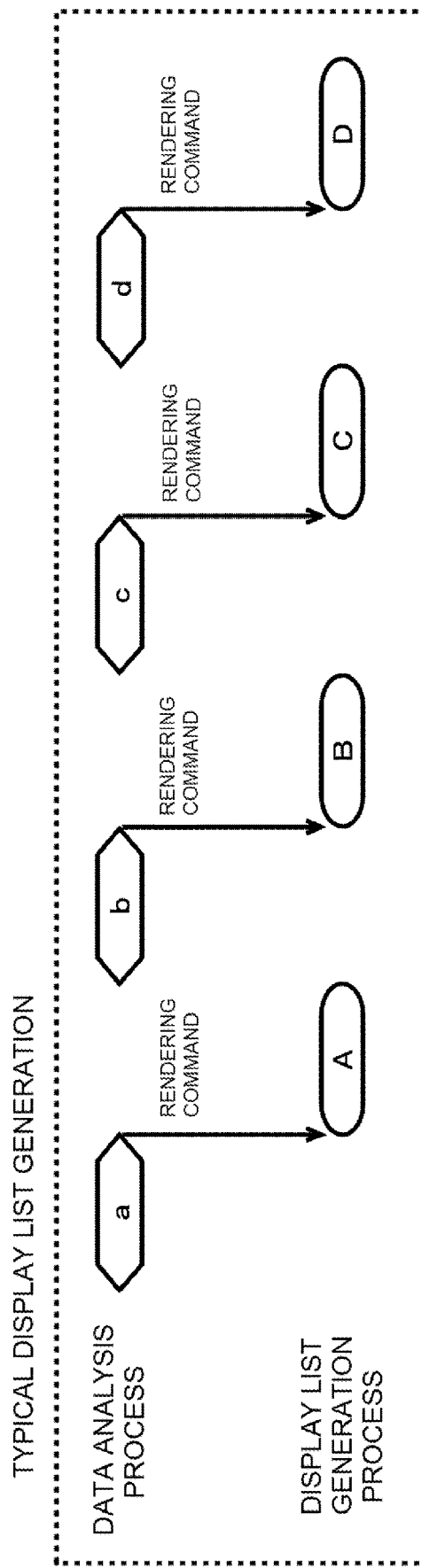

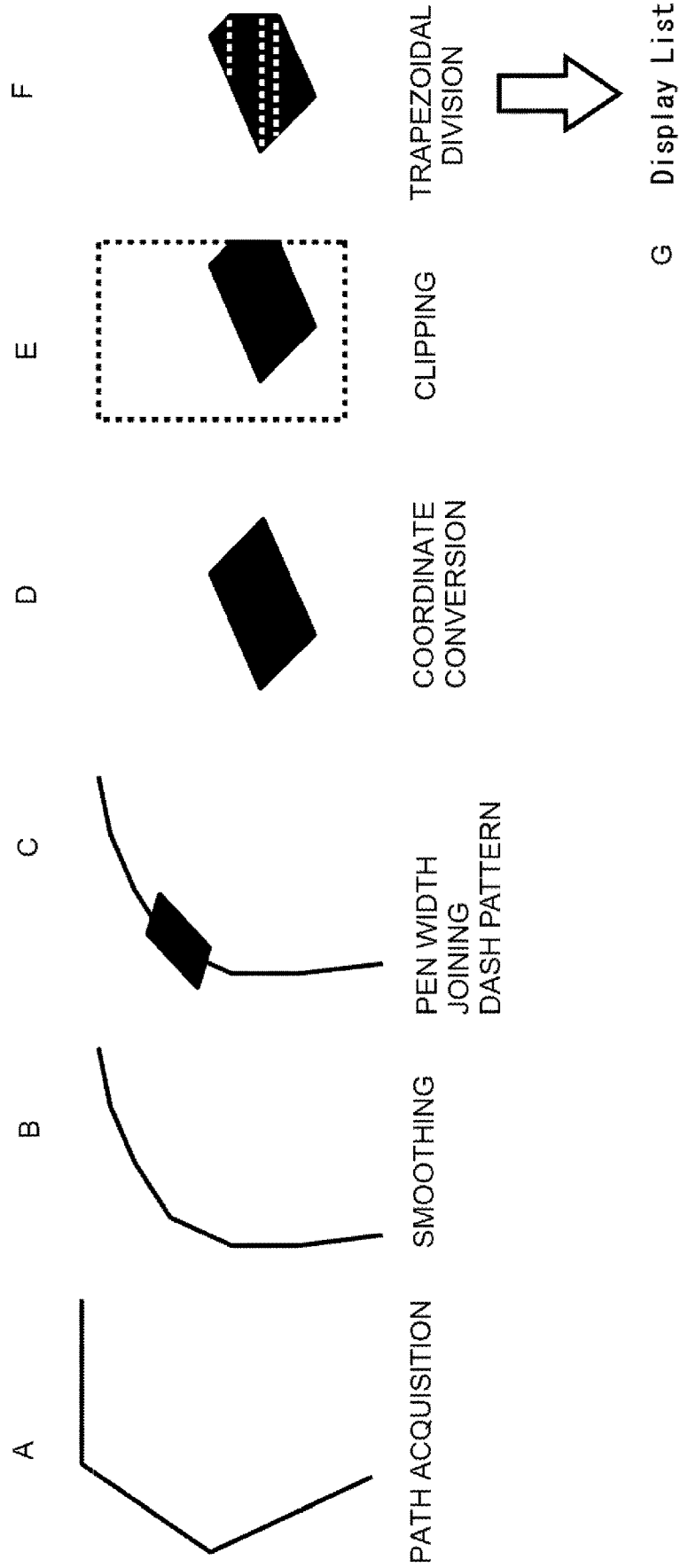

IMAGE FORMING APPARATUS AND RECORDING MEDIUM SUITABLE FOR IMAGE FORMING PROCESSING BASED ON PDL (PAGE DESCRIPTION LANGUAGE) WHICH GENERATES A DISPLAY LIST USING A SPECULATIVE PROCESS BEFORE DATA ANALYSIS OF AN OBJECT OF PDL IS COMPLETED

INCORPORATION BY REFERENCE

This application is based on and claims the benefit of priority from Japanese Patent Application No. 2017-214575 filed on Nov. 7, 2017, the contents of which are hereby incorporated by reference.

BACKGROUND

The present disclosure relates to an image forming apparatus and recording medium suitable for an image forming process based on PDL (Page Description Language).

For example, in an image forming apparatus such as a multifunction peripheral (MFP) or the like, an image forming process based on printing information indicated by PDL (Page Description Language), for example, is performed. Incidentally, the printing information indicated by the PDL includes vector data, text data, image data, and the like. Moreover, in an image forming process based on printing information indicated by PDL, a PDL analysis process and rendering process are performed. In other words, in the analysis process, printing information indicated by PDL is analyzed, and in the rendering process, rendering information for executing a printout and the like is generated based on the analyzed information.

Regarding an image forming process based on such PDL, in a typical technique, vector rendering commands are counted by a counting unit. A count-number determining unit determines whether or not the count number by the counting unit is equal to or greater than a threshold value. In the case where the count-number-determining unit determines that the count number is equal to or greater than the threshold value, a rendering-process-executing unit executes a number of vector rendering commands matching the count number counted by the counting unit. After the rendering-process-executing unit executes the rendering commands, a count-number-reset unit resets the count number counted by the counting unit. There is such a rendering process apparatus.

SUMMARY

The image forming apparatus according to the present disclosure includes a first rendering core, a second rendering core and a third rendering core. The first rendering core executes data analysis of an object of PDL format printing information. The second rendering core starts a speculative process for generating a Display List for the object before the data analysis is completed. The third rendering core executes a rendering process based on the Display List generated by the second rendering core. The data analysis by the first rendering core and the speculative process by the second rendering core are executed in parallel processing.

The recording medium according to the present disclosure is a non-transitory computer-readable recording medium for storing an image forming program executable on a computer of an image forming apparatus. When the computer executes the image forming program, the computer, by a first rendering core, executes data analysis of an object of PDL format printing information. The computer, by a second rendering core, starts a speculative process for generating a Display List for the object before the data analysis is completed. The computer, by a third rendering core executes a rendering process based on the Display List generated by the second rendering core. Moreover, the data analysis by the first rendering core and the speculative process by the second rendering core are executed in parallel processing.

BRIEF DESCRIPTION OF THE DRAWINGS

FIG. 2A is a diagram explaining an example of image processing by the rendering core module in FIG. 1, and illustrates the generation of a Display List by parallel processing and speculative processing by a first rendering core and a second rendering core of the rendering core module.

FIG. 2B is a diagram explaining an example of image processing by the rendering core module of FIG. 1, and illustrates typical generation of a Display List.

FIG. 3 is a diagram illustrating an example as an image of a step of generating a Display List for an object by the second rendering core of the rendering core module of FIG. 1.

DETAILED DESCRIPTION

In the following, an embodiment of the image forming apparatus according to the present disclosure will be described with reference to FIG. 1 to FIG. 4. Incidentally, as an example of the image forming apparatus in the following explanation is a multifunction peripheral (MFP) that, for example, is a complex peripheral apparatus equipped with a printing function, a copying function, a FAX function, a data transmitting/receiving function via a network, and the like.

Figure 1:
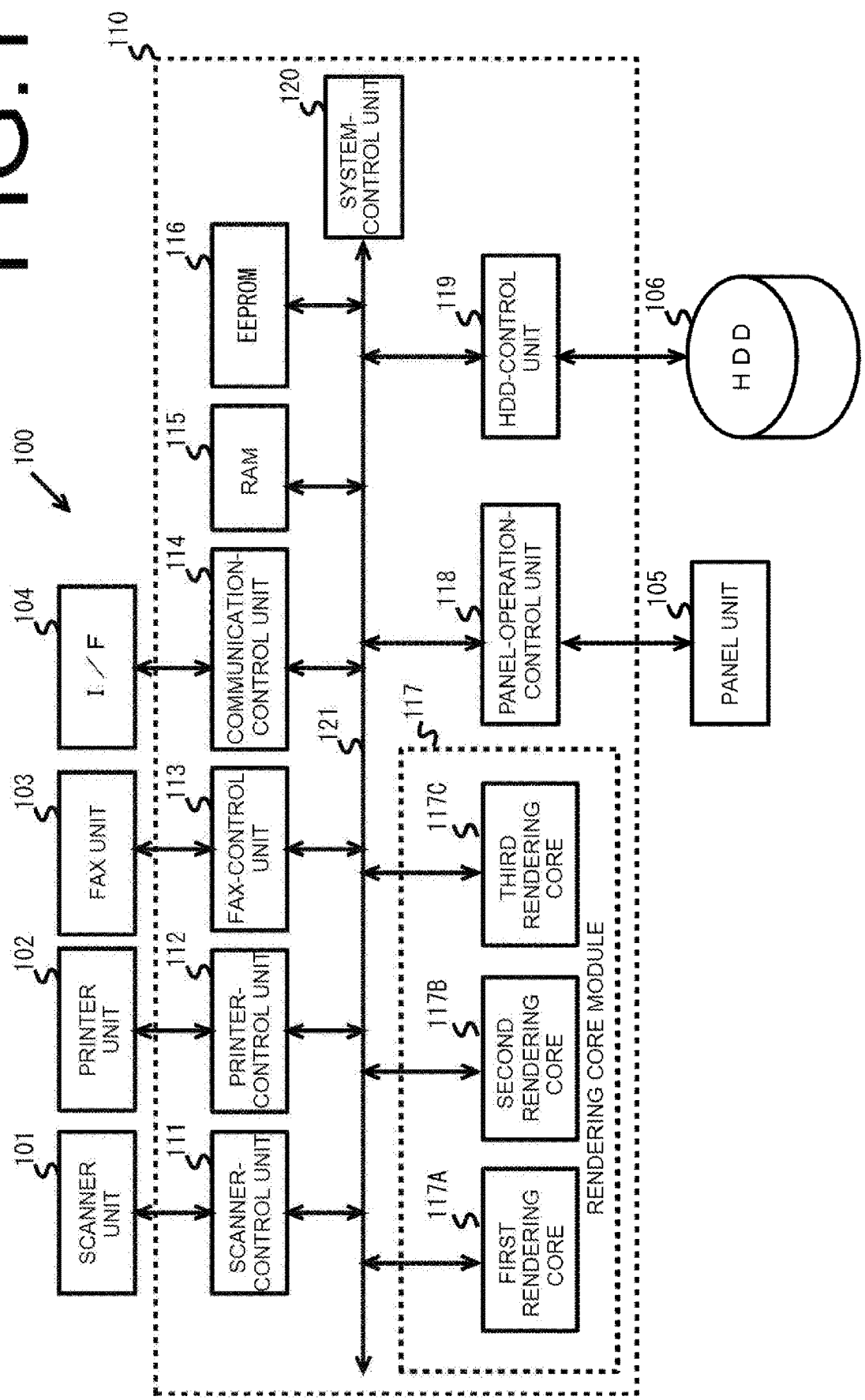
FIG. 1 is a diagram for explaining an embodiment in the case where an image forming apparatus according to the present disclosure is applied to an MFP.

First, as illustrated in FIG. 1, the MFP 100 includes a control unit 110 that controls operations of a scanner unit 101, a printer unit 102, a facsimile (FAX) unit 103, an I/F (interface) 104, a panel unit 105, and an HDD 106.

The scanner unit 101 is a device that converts an image of a document read by an image sensor into digital image data and inputs the digital image data to the control unit 110. The printer unit 102 is a device that prints an image on paper or the like based on printing data that is outputted from the control unit 110. The FAX unit 103 is a device that transmits data outputted from the control unit 110 to a facsimile of another party through a telephone line, and receives data from a facsimile of another party and inputs that data to the control unit 110.

The I/F 104 is responsible for communication with other MFPs, user terminals, and the like via a network. The I/F 104 may also be responsible for communication with a content server, a web server, or the like. The panel unit 105 is a device having a touch panel and hardware keys that, for example, performs a display for a printing function, a copying function, a FAX function, a data transmitting/receiving function via the network, and for various settings of the MFP 100. The HDD 106 is a storage device that stores application programs and the like for providing the various functions of the MFP 100. Moreover, the HDD 106 has a user box for storing printing jobs registered from the user terminal side.

The control unit 110 is a processor that controls the overall operation of the MFP 100 by executing an application program such as an authentication program or the like, an image forming program, a control program, and the like. The control unit 110 includes a scanner-control unit 111, a printer-control unit 112, a FAX-control unit 113, a communication-control unit 114, a random access memory (RAM) 115, an electrically erasable and programmable read-only memory (EEPROM) 116, a rendering core module 117, a panel-operation-control unit 118, an HDD-control unit 119, and a system-control unit 120. In addition, these units are connected to a data bus 121.

The scanner-control unit 111 controls the reading operation of the scanner unit 101. The printer-control unit 112 controls the printing operation of the printer unit 102. The FAX-control unit 113 controls the data transmitting/receiving operation by the FAX unit 103. The communication-control unit 114, via the I/F 104, controls transmission and reception of data and the like via the network. The RAM 115 is a work memory for executing a program. In addition, the RAM 115, as will be described in detail later, stores a Display List generated by the rendering core module 117 as intermediate data. Moreover, the RAM 115 stores printing data that has undergone image processing (rasterization) by the rendering core module 117. The EEPROM 116 stores a control program for checking the operation of each unit and generating a startup sequence, and the like.

The rendering core module 117 performs an image forming process based on printing information indicated by PDL (Page Description Language), for example, and has a first rendering core 117A, a second rendering core 117B, and a third rendering core 117C. Note that PDL format printing information includes vector data, text data, compressed image data, image data, and the like. However, in the present embodiment, for convenience of explanation, it is presumed that PDL format printing information is vector data. Incidentally, in the case of vector data, image bit mapping is performed through a scan line conversion process. In the case of text data, image bit mapping is performed by outlining the text and performing the scan line conversion of the outline. In the case of compressed image data, processing as image data is performed through an expansion process corresponding to the compression format. In the case of image data, a color matching process, a CMYK (Cyan, Magenta, Yellow, Key) conversion process, and a total amount control process are executed.

The first rendering core 117A executes data analysis of PDL format printing information (vector data). The second rendering core 117B, by a speculative process, executes generation of Display Lists A to D of graphics objects a to d (hereinafter simply referred to as objects a to d) indicated by PDL format printing information illustrated in FIG. 2 to be described later. Then, the second rendering core 117B stores the generated Display Lists A to D in the RAM 115 as intermediate data. The third rendering core 117C executes a rendering process for a printout or display output based on the Display Lists generated by the second rendering core 117B. Incidentally, data analysis by the first rendering core 117A and generation of Display Lists A to D by the second rendering core 117B are executed in parallel processing.

The panel-operation-control unit 118 controls the display operation of the panel unit 105. In addition, the panel-operation-control unit 118, via the panel unit 105, receives settings such as for printing, copying, FAX, data transmission and reception via the network and the like. The HDD-control unit 119 controls reading and writing of data to and from the HDD 106. When there is a print instruction based on the PDL, for example, the system-control unit 120 instructs the rendering core module 117 to perform image processing.

Next, an example of image processing by the rendering core module 117 will be described with reference to FIG. 2A and FIG. 2B. First, FIG. 2A illustrates generation of Display Lists by parallel processing and speculative processing by the rendering core module 117. The first rendering core 117A and the second rendering core 117B of the rendering core module 117 each executes parallel processing. Here, it is presumed, for example, that the first rendering core 117A is in charge of a data analysis process and the second rendering core 117B is in charge of a Display List generation process. Incidentally, the processing assignment of the first rendering core 117A and the second rendering core 117B may be set via the panel unit 105 or may be set as default.

In other words, the first rendering core 117A executes a data analysis process on PDL format printing information. The first rendering core 117A, by executing the data analysis process, acquires rendering commands for the objects a to d. As a result, the first rendering core 117A acquires the paths of the objects a to d included in the rendering command, and acquires graphics attributes related to smoothing, pen width, joining, dash patterns, coordinate conversion, and clipping. In this case, the first rendering core 117A executes a data analysis process on the object a of the PDL format printing information. Moreover, after the acquisition of the rendering command for the object a is completed, the first rendering core 117A sends a rendering request for the object a to the second rendering core 117B and executes a data analysis process for the object b following the object a. After the acquisition of the rendering command for the object b is completed, the first rendering core 117A sends a rendering request for the object b to the second rendering core 117B and executes a data analysis process for the object c following the object b. After the acquisition of the rendering command for the object c is completed, the first rendering core 117A sends a rendering request for the object c to the second rendering core 117B and executes a data analysis process for the object d following the object c.

On the other hand, although the details will be described later, the second rendering core 117B, after registering paths, executes generation of Display Lists on the objects a to d by a speculative process to generate Display Lists A to D. In addition, the second rendering core 117B stores the respective Display Lists A to D in the RAM 115 as intermediate data. Moreover, in the case where generation of the Display List for the object c fails, for example, the second rendering core 117B references the intermediate data stored in the RAM 115. The second rendering core 117B executes generation of the Display List for the object c again to generate a Display List C'. Then, the second rendering core 117B generates a Display List D for the object d, and ends the process. Incidentally, when generating the Display Lists A to D, the second rendering core 117B executes a pipeline process depending on the contents of the respective objects a to d.

On the other hand, FIG. 2B illustrates generation of Display Lists by a typical rendering module. In other words, in a typical rendering module, a data analysis process is executed on object a of PDL format printing information. Then, after acquisition of a rendering command for the object a is completed, the Display List A is generated for the object a in accordance with a rendering request for the object a, and the Display List A is stored in the RAM 115. In addition, in the rendering module, after Display List A is successfully generated, a Display List B for object b is generated and stored in RAM 115. Moreover, in the rendering module, after Display List B is successfully generated, a Display List C for object c is generated and stored in RAM 115. Furthermore, in the rendering module, after Display List C is successfully generated, a Display List D for object d is generated and stored in RAM 115. In other words, in the case of generating a Display List by a typical rendering module, a data analysis process for objects a to d of PDL format printing information and generation of Display Lists A to D for objects a to d are executed in a series of flows. Therefore, generation of Display Lists A to D is not executed until a rendering command is acquired.

Next, referring to FIG. 3, an example of the step of generating the Display List A for the object a by the second rendering core 117B will be explained. Note that FIG. 3 is an image of the generation step of Display List A.

First, as illustrated in the element A, the second rendering core 117B acquires data indicating the path of the object a. Incidentally, the path includes data indicating, for example, an anchor point, a segment, and a handle (direction line). Next, as illustrated by the element B, the second rendering core 117B smoothes the figure indicated by the path. Next, as illustrated in element C, the second rendering core 117 B acquires data indicating the pen width, joining, and the dash pattern from the object a, after which, as illustrated in element D, the second rendering core 117B acquires data from the object a indicating coordinate conversion. In addition, as illustrated in Element E, the second rendering core 117B acquires data from the object a indicating clipping. Moreover, as illustrated in element F, the second rendering core 117B acquires data from the object a indicating trapezoidal division. Then, as illustrated in element G, the second rendering core 117B generates a Display List for the object a. Note that the Display List for object a is executed by a pipeline process.

Figure 4:
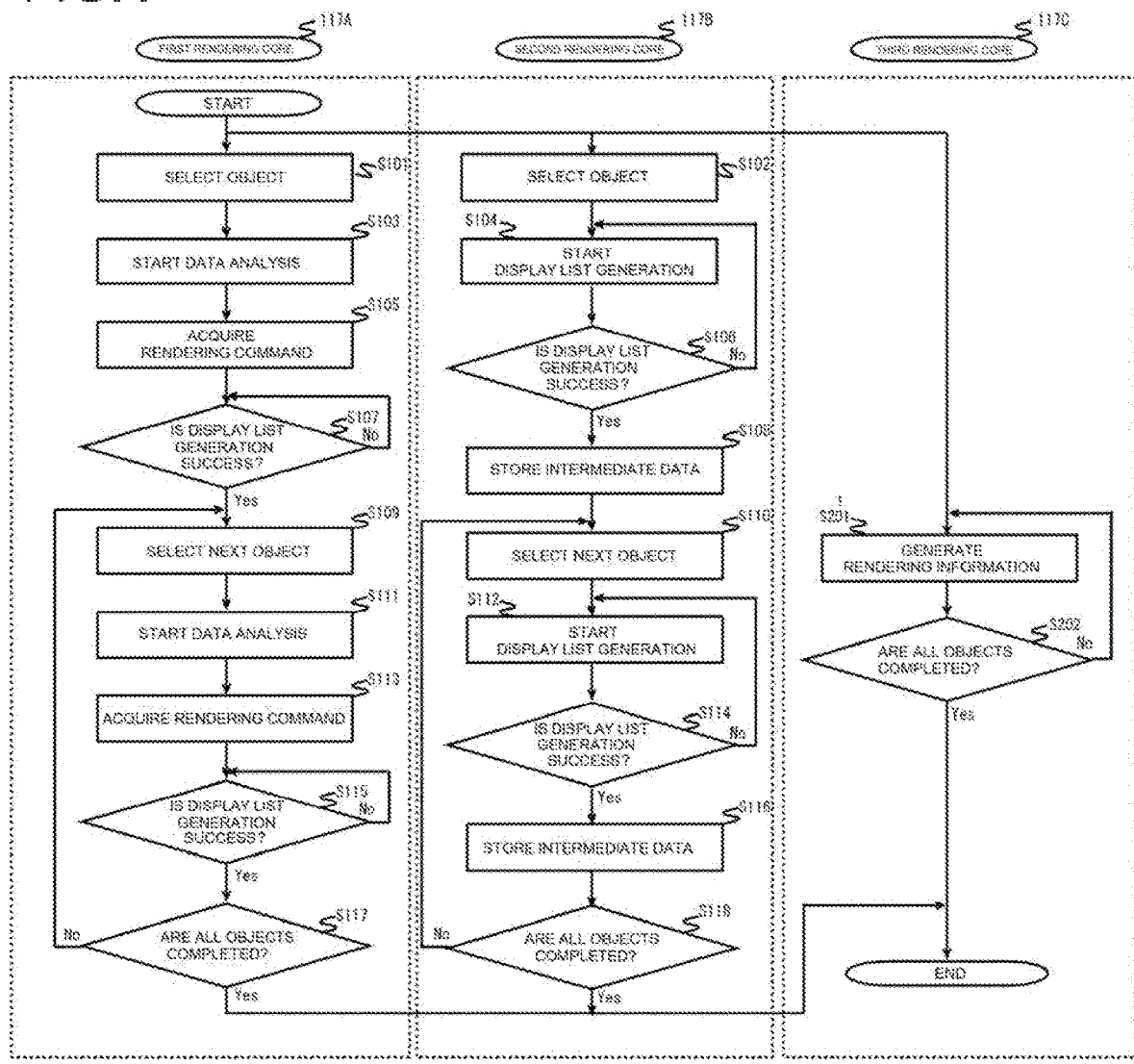
FIG. 4 is a flowchart for explaining an image forming process by the rendering core module in FIG. 1.

Next, referring to FIG. 4, an image forming process by the rendering core module 117 will be explained. Incidentally, in the following description, it is presumed that the data of the PDL format printing information is a vector. In addition, in the following, the example below will be explained. The first rendering core 117A of the rendering core module 117 performs data analysis of the PDL format printing information. The second rendering core 117B executes generation of Display Lists A to D of the objects a to d indicated by the PDL format printing information of FIG. 2A by a speculative process. The generated Display Lists A to D are stored in the RAM 115 as intermediate data. The third rendering core 117C executes a rendering process for a printout or display output based on the Display Lists A to D generated by the second rendering core 117B. Moreover, in the following explanation, it is presumed that PDL format printing information is transmitted from a user terminal and acquired via the I/F 104.

(Step S101)
The first rendering core 117A selects the object a from the PDL format printing information.
(Step S102)
The second rendering core 117B selects the object a from the PDL format printing information.

In this case, the second rendering core 117B selects the object a simultaneously with the selection of the object a by the first rendering core 117A. Incidentally, the second rendering core 117B may select the object a before the selection of the object a by the first rendering core 117A.

(Step S103)
The first rendering core 117A starts data analysis of the object a.
(Step S104)
The second rendering core 117B starts generation of the Display List A for the object a.

In this case, the second rendering core 117B starts the generation of the Display List A for the object a at the same time as the start of data analysis of the object a by the first rendering core 117A. At this time, since the data analysis of the object a by the first rendering core 117A is not yet completed, the second rendering core 117B executes a speculative process for generating the Display List A using a default setting value for each graphics attribute. Incidentally, the second rendering core 117B may start generation of the Display List A for the object a before the start of the data analysis of the object a by the first rendering core 117A.
(Step S105)
The first rendering core 117A acquires a rendering command of the object a.

In this case, the first rendering core 117A completes acquisition of the rendering command of the object a, and sends a rendering request to the second rendering core 117B. As a result, data analysis for object a is completed and it is possible to move on to data analysis for the next object b. At this time, the second rendering core 117B receives a rendering request from the first rendering core 117A.
(Step S106)
The second rendering core 117B determines whether or not the generation of the Display List A is success.

In this case, when it is determined that the setting value of the graphics attribute is different from the default setting value, the second rendering core 117B determines that the generation of the Display List A is failure (step S106: NO). The setting value of the graphics attribute is acquired from the printing information by the first rendering core 117A based on the rendering request. Whether or not the setting value differs from the default setting value is determined during or after the process of generating the Display List A for the object a. Being different from the default setting value is a case where the graphics attribute used for generating the Display List A is different from the graphics attribute based on the rendering command of the object a. At this time, the second rendering core 117B returns to step S104 and performs generation of the Display List A for the object a again using the setting value of the graphics attribute based on the rendering command of the object a acquired by the first rendering core 117A. In addition, the second rendering core 117B notifies the first rendering core 117A that the generation of the Display List A is failure.

Incidentally, in the case where the second rendering core 117B is failure to generate the Display List A for the object a, the second rendering core 117B may store the Display List A that is generated just before the failure in the RAM 115. By doing so, when returning to the step S104 and performing generation of the Display List A for the object a again, it is possible to execute only the generation of the Display List A of the failed part by confirming the data up to the point immediately before the failure of the Display List A. As a result, the time for regeneration of the Display List A can be shortened.

On the other hand, in the case where the process for generating the Display List A for the object a progresses to the end, the second rendering core 117B determines that the generation of the Display List A is successful (step S106: YES), and the process moves to step S108.

At this time, the second rendering core 117B notifies the first rendering core 117A that the generation of the Display List A is successful.

(Step S107)

The first rendering core 117A determines whether or not the generation of the Display List A is success.

In this case, when a notification indicating that the generation of the Display List A is failure is received from the second rendering core 117B, the first rendering core 117A determines that the generation of the Display List A is not successful (step S107: NO), and waits.

On the other hand, when a notification indicating that the generation of the Display List A is successful is received from the second rendering core 117B, the first rendering core 117A determines that the generation of the Display List A is successful (step S107: YES), and the process moves to step S109.

(Step S108)

The second rendering core 117B stores the Display List A in the RAM 115 as intermediate data.

(Step S109)

The first rendering core 117A selects the next object b from the PDL format printing information.

(Step S110)

The second rendering core 117B selects the object b from the PDL format printing information.

In this case, the second rendering core 117B may select the object b simultaneously with the selection of the object b by the first rendering core 117A. Moreover, the second rendering core 117B may select the object b before the selection of the object b by the first rendering core 117A.

(Step S111)

The first rendering core 117A starts data analysis for the object b.

(Step S112)

The second rendering core 117B starts the generation of the Display List B for the object b in the same manner as in step S104.

In this case, the second rendering core 117B may start the generation of the Display List B for the object b simultaneously with the start of the data analysis for the object b by the first rendering core 117A. The second rendering core 117B may start the generation of the Display List B for the object b before the start of the data analysis for the object b by the first rendering core 117A.

(Step S113)

The first rendering core 117A acquires a rendering command for the object b.

In this case, by acquiring the rendering command for the object b, the first rendering core 117A can move to the data analysis for the next object c.

(Step S114)

The second rendering core 117B determines whether or not the generation of the Display List B is success.

In this case, when the graphics attribute is determined to be different from the default setting value, the second rendering core 117B determines that the generation of the Display List B is failure (step S 114: NO). The graphics attribute is acquired from the printing information by the first rendering core 117A. Determining whether or not the graphics attribute differs from the default setting value is performed during or after the process of generating the Display List B for object b. Being different from the default setting value is a case where the graphics attribute used for generating the Display List B is different from the graphics attribute based on the rendering command of the object b. At this time, the second rendering core 117B returns to step S112 and performs generation of the Display List B for the object b again using the setting value of the graphics attribute based on the rendering command for the object b acquired by the first rendering core 117A. In addition, the second rendering core 117B notifies the first rendering core 117 A that the generation of the Display List B is failure.

Incidentally, in the case where the second rendering core 117B is failure to generate the Display List B for the object b, as described above, the second rendering core 117B may store the Display List B just before the failure in the RAM 115. By doing so, when returning to the step S112 and performing generation of the Display List B for the object b again, it is possible to execute only the generation of the Display List B of the failed part by confirming the data up to the point immediately before the failure of the Display List B. As a result, the time for regeneration of the Display List B can be shortened.

On the other hand, in the case where the process for generating the Display List B for the object b progresses to the end, the second rendering core 117B determines that the generation of the Display List B is successful (step S114: YES), and the process moves to step S116.

At this time, the second rendering core 117B notifies the first rendering core 117A that the generation of the Display List B is successful.

(Step S115)

The first rendering core 117A determines whether or not the generation of the Display List B is success.

In this case, when a notification indicating that the generation of the Display List B is failure is received from the second rendering core 117B, the first rendering core 117A determines that the generation of the Display List B is not success (step S115: NO), and waits.

On the other hand, when a notification indicating that the generation of the Display List B is success is received from the second rendering core 117B, the first rendering core 117A determines that the generation of the Display List B is success (step S115: YES), and the process moves to step S117.

(Step S116)

The second rendering core 117B stores the Display List B in the RAM 115 as intermediate data.

(Step S117)

The first rendering core 117A determines whether or not data analysis for all objects a to d has been completed.

In this case, the first rendering core 117A returns to the step S109 in the case where data analysis of all the objects a to d of the PDL format printing information has not been completed (step S117: NO), and continues data analysis for the remaining objects a to d.

On the other hand, the first rendering core 117A ends the process in the case where data analysis for all the objects a to d in the PDL format printing information is completed (step S117: YES).

(Step S118)

The second rendering core 117B determines whether or not generation of Display Lists A to D for all of the objects a to d has been completed.

In this case, the second rendering core 117B returns to the step S110 in the case where the generation of Display Lists A to D for all of the objects a to d of PDL format printing information has not been completed (step S118: NO). Then the second rendering core 117B continues generation of the Display Lists A to D for the remaining objects a to d.

On the other hand, the second rendering core 117B ends the process in the case where generation of the Display Lists A to D for all of the objects a to d of PDL format printing information is completed (step S118: YES).

(Step S201)

The third rendering core 117C generates rendering information based on the Display Lists A to D stored in the RAM 115.

In this case, the third rendering core 117C sequentially generates rendering information for a printout or display output based on the Display Lists A to D at a timing when the Display Lists A to D are sequentially stored in the RAM 115.

(Step S202)

The third rendering core 117C determines whether or not the generation of rendering information based on the Display Lists A to D for all the objects a to d has been completed.

In this case, the third rendering core 117C returns to step S201 in the case where the generation of rendering information based on the Display Lists A to D for all the objects a to d in the PDL format printing information has not been completed (step S 202: NO). Then, the third rendering core 117C continues the generation of rendering information based on the Display Lists A to D for the remaining objects a to d.

On the other hand, the third rendering core 117C ends the process when the generation of rendering information based on the Display Lists A to D for all the objects a to d in the PDL format printing information has been completed (step S202: YES).

In addition, the third rendering core 117C deletes the Display Lists A to D stored in the RAM 115 in the case where the generation of rendering information based on the Display Lists A to D is completed.

Incidentally, in the above explanation, the PDL format printing information is vector data, however, the PDL format printing information may be text data, compressed image data, image data, or the like. Similarly, data analysis and the generation of Display Lists by speculative processing may be executed in parallel processing.

As described above, in the present embodiment, the first rendering core 117A of the rendering core module 117 executes data analysis of the objects of PDL format printing information. The second rendering core 117B executes a speculative process for the generation of Display Lists A to D for the objects a to d. The third rendering core 117C executes a rendering process for a printout or display output based on the Display Lists A to D generated by the second rendering core 117B. In addition, data analysis by the first rendering core 117A and the speculative process by the second rendering core 117B are executed in parallel processing.

As a result, since the second rendering core 117B can generate the Display Lists A to D by a speculative process even without receiving a rendering command from the first rendering core 117A, it is possible to further speed up the image forming process.

Incidentally, in this embodiment, the image forming apparatus is applied to a MFP 100, however, the present invention is not limited to this, and may be applied to other image forming apparatuses such as a multifunction printer or the like, or may be applied to electronic equipment such as a personal computer (PC) or the like.

In the rendering processing apparatus of the typical technique described above, since rendering commands of a number of vectors equal to or larger than a threshold value are collectively executed, it is possible to perform high-speed processing of printing data in which many vector rendering commands are used consecutively.

Incidentally, the above-described rendering process in an image forming process based on PDL includes a Display List generation process and a rendering process based on Display Lists. In addition, the Display List generation process is executed after receiving a rendering command in the PDL analysis process.

For this reason, the rendering processing apparatus of a typical technique collectively executes a number of vector rendering commands equal to or larger than a threshold value. Therefore, it is not possible to generate a Display List based on the next rendering command until after receiving the next rendering command after generating the Display List based on the previous rendering command. As a result, it is not possible to further speed up of the image forming process.

With the image forming apparatus and the recording medium according to the present disclosure, the second rendering core can execute the generation of a Display List by a speculative process even without receiving a rendering command from the first rendering core, so the second rendering core can further speed up the image forming process.

What is claimed is:

1. An image forming apparatus comprising a control unit which is a processor that controls operation of the image forming apparatus by reading an application program stored in memory, wherein the control unit comprises:
   a first rendering core for executing data analysis of an object of PDL format printing information;
   a second rendering core for starting a speculative process for generating a Display List for the object before the data analysis is completed; and
   a third rendering core for executing a rendering process based on the Display List generated by the second rendering core; wherein
   the first rendering core (i) acquires a rendering command for the object by executing the data analysis, (ii) acquires a path of the object wherein the path is included in the rendering command, and (iii) acquires a first setting value of a graphics attribute based on the rendering command;
   the second rendering core, (i) after registering the path, generates the Display List by using a default setting value of the graphics attribute by the speculative process, (ii) when the default setting value of the graphics attribute is different from the first setting value of the graphics attribute based on the rendering command, determines that the speculative process for generating the Display List is a failure, and (iii) generates the Display List again by using the first setting value of the graphics attribute based on the rendering command by executing the data analysis; and
   the data analysis by the first rendering core and the speculative process by the second rendering core are executed in parallel processing.

2. The image forming apparatus according to claim 1, further comprising
   a storage device for storing the Display List; wherein
   the second rendering core, in the case where the speculative process for generating the Display List is the failure, causes the storage device to store the Display List up to the point immediately before the failure, checks data up to the point immediately before failure of the Display List stored in the storage device, and executes generation of a failed portion of the Display List.

3. A recording medium that is a non-transitory computer-readable recording medium for storing an image forming program executable on a computer of an image forming apparatus wherein the image forming apparatus comprises a control unit which is a processor and comprises a first rendering core, a second rendering core, and a third rendering core, and when the computer executes the image forming program:

the first rendering core executes data analysis of an object of PDL format printing information;

the second rendering core starts a speculative process for generating a Display List for the object before the data analysis is completed; and the third rendering core executes a rendering process based on the Display List generated by the second rendering core; wherein the first rendering core (i) acquires a rendering command for the object by executing the data analysis, (ii) acquires a path of the object wherein the path is included in the rendering command, and (iii) acquires a first setting value of a graphics attribute based on the rendering command;

the second rendering core, (i) after registering the path, generates the Display List by using a default setting value of the graphics attribute by the speculative process, (ii) when the default setting value of the graphics attribute is different from the first setting value of the graphics attribute based on the rendering command, determines that the speculative process for generating the Display List is a failure, and (iii) generates the Display List again by using the first setting value of the graphics attribute based on the rendering command by executing the data analysis; and the data analysis by the first rendering core and the speculative process by the second rendering core are executed in parallel processing.

* * * * *